(12) United States Patent
Bottreau et al.

(10) Patent No.: US 6,625,213 B2
(45) Date of Patent: Sep. 23, 2003

(54) VIDEO ENCODING METHOD BASED ON THE MATCHING PURSUIT ALGORITHM

(75) Inventors: Vincent Bottreau, Paris (FR); Marion Benetiere, Nogent sur Marne (FR); Beatrice Pesquet-Popescu, Fontenay-sous-Bois (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 474 days.

(21) Appl. No.: 09/752,945

(22) Filed: Dec. 28, 2000

(65) Prior Publication Data

US 2001/0028683 A1 Oct. 11, 2001

(30) Foreign Application Priority Data

Dec. 28, 1999 (EP) .............................................. 99403307

(51) Int. Cl.$^7$ ................................................. H04N 7/12
(52) U.S. Cl. .............................. 375/240.08; 375/240.09
(58) Field of Search ....................... 375/240.08, 240.09, 375/240.02, 240.18; 348/375.1, 399.1, 403.1, 422.1; 382/240–243, 248

(56) References Cited

U.S. PATENT DOCUMENTS

2002/0075857 A1 * 6/2002 LeBlanc ...................... 370/352
2002/0080779 A1 * 6/2002 LeBlanc ...................... 370/352

OTHER PUBLICATIONS

Mallat et al, "Matching pursuit of images", Proceedings., International Conference on Image Processing, vol. 1, pp. 53–56, Oct. 1995.*

Mallat et al, "Matching Pursuits with time–frequency dictionaries", IEEE Transactions on Signal Processing, vol. 41, iss. 12, pp. 3397–3415, Dec. 1993.*

Gharavi–Alkhansari et al, "Fractal video coding by matching pursuit", International Conference on Image Processing, vol. 1, pp. 157–160, Sep. 1996.*

De Vleeschouwer et al, "SNR scalability based on matching pursuits", IEEE Transactions on Multimedia, vol. 2, iss. 4, pp. 198–208, Dec. 2000.*

Tariq et al, "Robust and scalable matching pursuits video transmission using the Bluetooth air interface standard", Internationa Conference on Consumer Electronics, pp. 300–301, Jun. 2000.*

Osama K. Al–Shaykh "Video Compression Using Matfching Pursuits", Feb. 1999, PG.

P. Salembier et al, "Very Low Bit Rate Video Coding Using Active Triangular Mesh", May 1996, PG 2060–2063.

* cited by examiner

*Primary Examiner*—Vu Le
(74) *Attorney, Agent, or Firm*—Russell Gross

(57) ABSTRACT

The invention relates to the field of video encoders and, more particularly, to an encoding method based on an adaptation of the matching pursuit method to an error texture coding process inside triangular meshes. Said process is restricted, at each iteration of the method, to a specific triangle selected according to a predefined criterion. An optimal strategy for atom positioning inside this triangle then consists either in arbitrarily selecting the geometrical barycenter of the selected triangle as the center of the atoms, or re-using the error energy information for atom center positioning, the Displaced Frame Difference (DFD) energy barycenter inside the selected triangle having the highest energy being in the second case arbitrarily chosen as the center of the atoms.

7 Claims, 3 Drawing Sheets

VIDEO ENCODING METHOD BASED ON THE MATCHING PURSUIT ALGORITHM

FIELD OF THE INVENTION

The present invention relates to the field of video encoders and, more particularly, to an encoding method based on an adaptation of the so-called matching pursuit method (MP) and provided to be implemented in a signal-to-noise ratio (SNR) scalable video encoder.

BACKGROUND OF THE INVENTION

In the multimedia domain, new interactive applications such as Internet video streaming, video database browsing or multi-quality video services are becoming widespread. This leads to an expansion of video services over heterogeneous networks (the Internet, mobile nets and In Home Digital Networks), which has raised new issues in terms of varying transport conditions (bandwidth, error rate . . . ) as well as varying consumer demands and terminal decoding capabilities (CPU, display size, application . . . ). Consequently, there is a need for new flexible and intrinsically robust video compression systems which can handle these new constraints, especially at very low bit rates. The notion of scalability is the expected functionality to address these issues. For instance, only one part of an embedded bitstream may be sent to a particular user so as to avoid network congestion, or the entire bitstream can be partially decoded according to the targeted level of quality. Current standards such as MPEG-4 are working toward video coding schemes that provide this functionality.

MPEG-4 lies on a classical block-based predictive hybrid scheme in which the prediction error coding after motion compensation is realized by means of a Discrete Cosine Transform (DCT). However, DCT appears to suffer from very annoying visual artifacts at low bit rates (especially block edge artifacts), because the number of coded coefficients becomes very low and the quantization is coarse. An alternative to DCT, better suited to low bit rate and tested in MEPG-4, is based on the so-called Matching Pursuit (MP) algorithm, described for instance in "Matching pursuits with time-frequency dictionaries", by S. Mallat and Z. Zhang, IEEE Transactions on Signal Processing, vol.41, n°12, December 1993, pp.3397–3415.

As described in said document, MP is a time-frequency transform that expands the motion residual signal in an iterative manner, using an overcomplete dictionary of bidimensional (2D) functions called atoms. This algorithm iteratively calculates the atom minimizing the mean-squared error of the signal that has to be encoded. The multistage algorithm proceeds according to the following steps:

- the highest-energy image block on a rectangular search window is computed; around this block, the projection that maximizes the inner product between the basis functions and the residual image at the current iteration is calculated: a high inner product value indicates that the corresponding atom fits the signal structure;
- this weighted atom is then subtracted from the current error image to produce the new residual image for the next stage.

The method complexity comes from the fact that the algorithm searches the best atom among all atoms in the dictionary at each iteration. Table 1 shows the atom dictionary that is traditionally used in the classical block-based Matching Pursuit implementation (the parameters $S_i$, $F_i$ and $P_i$ respectively designating the scale, the frequency and the phase of the atom):

| i | $S_i$ | $F_i$ | $P_i$ |
|---|---|---|---|
| 1 | 1.0 | 0.0 | 0 |
| 2 | 3.0 | 0.0 | 0 |
| 3 | 5.0 | 0.0 | 0 |
| 4 | 7.0 | 0.0 | 0 |
| 5 | 9.0 | 0.0 | 0 |
| 6 | 12.0 | 0.0 | 0 |
| 7 | 14.0 | 0.0 | 0 |
| 8 | 17.0 | 0.0 | 0 |
| 9 | 20.0 | 0.0 | 0 |
| 10 | 1.4 | 1.0 | $\pi/2$ |
| 11 | 5.0 | 1.0 | $\pi/2$ |
| 12 | 12.0 | 1.0 | $\pi/2$ |
| 13 | 16.0 | 1.0 | $\pi/2$ |
| 14 | 20.0 | 1.0 | $\pi/2$ |
| 15 | 4.0 | 2.0 | 0 |
| 16 | 4.0 | 3.0 | 0 |
| 17 | 8.0 | 3.0 | 0 |
| 18 | 4.0 | 4.0 | 0 |
| 19 | 4.0 | 2.0 | $\pi/4$ |
| 20 | 4.0 | 4.0 | $\pi/4$ |

The redundancy of the dictionary allows a larger degree of freedom in the choice of the signal decomposition. It is all the more interesting in the case of low bit rate coding, since MP only employs the required functions to represent accurately the signal, thus resulting in a better compression efficiency. Moreover, MP is iterative, and the residual energy therefore decreases at each iteration. The procedure is iterated until this residual energy falls down below a given threshold or the available amount of bits is exhausted. The representation is adaptive in the sense that the most significant coefficients are first extracted. Therefore, MP encodes the residual error in decreasing order of importance, which is attractive for quality (SNR) scalability. Additional coefficients corresponding to finer details in the signal structure may be generated during the next step of the algorithm.

The dictionary is generally composed of bidimensional (2D) separable Gabor functions represented by parameters governing the scale of a modulated Gaussian function, and the frequency and phase of a modulating function. The choice of the dictionary is important since it is strongly related to the convergence speed of the decomposition and thus to the efficiency of the algorithm. Gabor functions are chosen for their smooth decay at edges, which limits visual artifacts. Moreover, atoms may be positioned at any pixel location of the entire error image in order to match the signal structures. Atom overlapping is enabled, which increases the expansion smoothness.

Although the superiority of this MP method over the DCT has been clearly shown by several studies, the DCT remains the only texture coding method used in MPEG-4 (the reason is that the DCT is a very well mature method, for which many software and hardware optimizations exist). Moreover, MP is an iterative algorithm, for which no parallelism techniques exist and which is complex at the encoder side. However, MP seems well suited to texture description inside arbitrarily shaped objects and provides a progressive representation of information in an embedded bitstream, thus allowing scalability.

As current video standards have not been originally designed to provide scalability (they have been upgraded so as to include this new functionality while preserving their existing architecture), this scalability is generally achieved through a layer structure that delivers two or more separated bitstreams. This approach suffers from a lack of flexibility and a low coding efficiency of the enhancement layer. Moreover, the basic types of scalability (spatial, temporal, SNR) cannot be reached at the same time. As a result, ITU and MPEG committee experts are looking, in the domain of very low bit rate, for fully scalable video coding schemes that allow a greater interactivity. A promising approach deals with the use of a triangular mesh-based representation (i.e. a subdivision of the image domain into elementary patches, most currently triangular because this configuration is very flexible) for object-based compression and composition. Such an operation aims at defining homogeneous regions with a limited number of elements, according to the targeted accuracy of the scene description, and can even be hierarchical. The hierarchy is then initialized to an arbitrary coarse mesh that is successively refined according to a specific criterion, thus allowing a description whose accuracy increases from level to level.

It has then be proposed to exploit the main advantages provided by meshes: spatial adaptability for efficient object contour encoding, deformation capacity for object tracking, compact and robust motion estimation even at low bit rates without the visual artifacts generally encountered with other representations. Triangular meshes are attractive for functionalities such as texture animation and deformation, content-based retrieval of video-objects, augmented reality, transfiguration, etc. Moreover, their extension to hierarchical meshes is a possible response to scalability. However, only few known works are related to the subject of texture coding inside meshes, these existing studies being based on adaptations of the DCT, originally designed only for rectangular decompositions.

SUMMARY OF THE INVENTION

It is therefore an object of the invention to propose a video encoding method that uses and adapts the MP algorithm to a texture error coding inside triangular meshes, in order to benefit from MP features, namely a progressive information transmission in decreasing order of importance and a smooth signal representation even at low bit rates.

To this end, the invention relates to based on an adaptation of the so-called matching pursuit method (MP) in which said error texture coding process inside triangular meshes is restricted, at each iteration of said MP method, to a specific triangle selected according to a predefined criterion and with respect to which the optimal strategy for atom positioning inside this triangle, in view of a fast energy decrease of the error signal, consists in arbitrarily selecting the geometrical barycenter of the selected triangle as the center of the atoms, no additional information concerning atom positions being transmitted to the decoder.

The proposed solution provides the targeted video-coding scheme with a prediction error coding tool well suited to mesh-based coding. Based on the MP algorithm, this method benefits from the mesh characteristics, while being especially designed to match the triangle support. Given any selected triangle, the issue is to find the optimal strategy for atom positioning inside said triangle, resulting in a fast energy decrease of the error signal and a precise and smooth signal decomposition. This geometrical positioning method results in a bit budget gain in comparison to the block-based approach for which each atom position has to be encoded.

In another embodiment, the invention relates to an encoding method based on an adaptation of the so-called matching pursuit method (MP) in which said error texture coding process inside triangular meshes is restricted, at each iteration of said MP method, to a specific triangle selected according to a predefined criterion and with respect to which the optimal strategy for atom positioning inside this triangle, in view of a fast energy decrease of the error signal, consists in re-using the error energy information for atom center positioning, the Displaced Frame Difference (DFD) energy barycenter inside the selected triangle that has the highest energy being then arbitrarily chosen as the center of the atoms, and this position inside the triangle being an additional information transmitted to the decoder.

If the geometrical choice (corresponding to the first embodiment) ensures that the atoms stay in the middle of the triangle, it result however in loosing the property of the MP with respect to the positioning freedom. By re-using the error energy information for atom center positioning, an atom coding efficiency more similar to the block-based approach is obtained.

This implementation may still be improved by adding to it the possibility to orient one atom axis along the direction of the most important energy. A better atom positioning is thus obtained, the atom axes being aligned with the error signal that has to be approximated.

BRIEF DESCRIPTION OF THE DRAWINGS

The particularities of the invention will now be explained in a more detailed manner, with reference to the accompanying drawings in which.

DETAILED DESCRIPTION OF THE INVENTION

When using the MP algorithm, originally applied on image blocks, in order to adapt it and fulfill the strong constraint of allowing texture enhancement only on a triangular mesh support, it becomes impossible to allow the same degree of freedom concerning atom positioning and atom overlapping as for the block-based approach. At each iteration of the MP procedure, error texture coding has to be restricted to a specific triangle, the one selected according to an energy criterion for instance. Therefore, atom encoding has to be performed in another way so as to avoid atoms located on a triangle edge, which may introduce visual artifacts. Given the selected triangle, the issue is to find the optimal strategy for atom positioning inside this triangle, that is the strategy resulting in a fast energy decrease of the error signal, a precise and smooth signal decomposition. Such atom-positioning methods are now described with reference to FIGS. 1 to 3, the prediction error encoding being in each case performed at the triangle scale (the bounding box surrounding each triangle is shown in interrupted lines). With respect to the functions used to encode the motion residual image, no special modification has been introduced to make use of the mesh structure: they are still real 2D Gabor functions.

Figure 1:
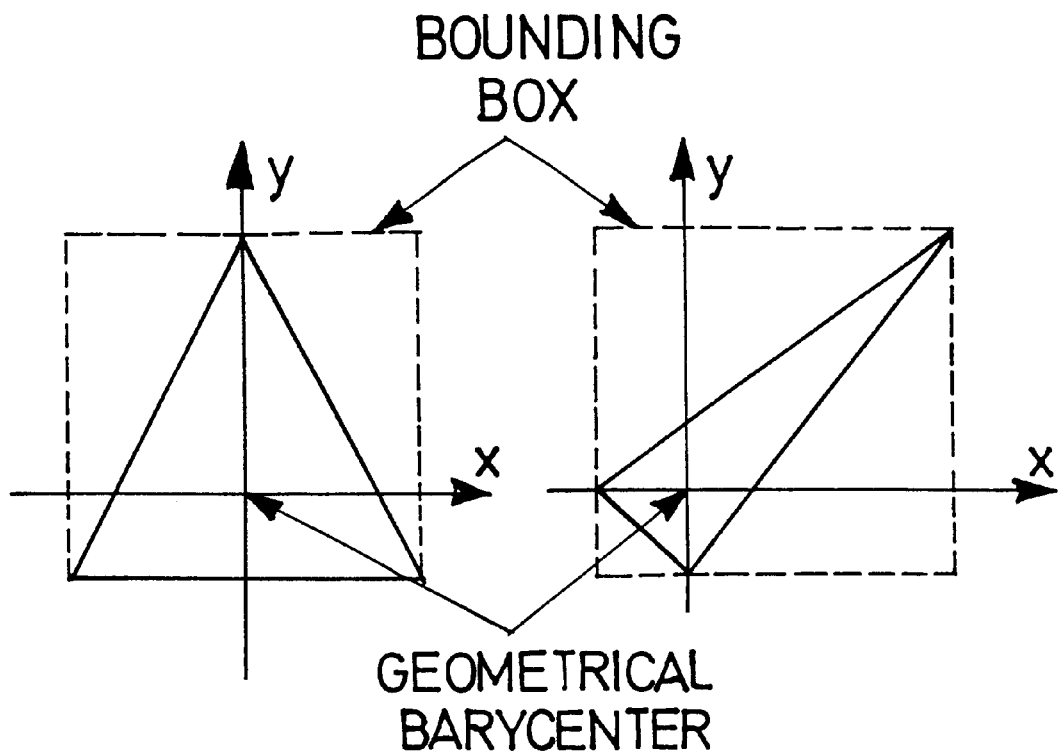
FIG. 1 illustrates, when finding the optimal strategy for atom positioning inside a selected triangle, a geometrical atom positioning method.

The simplest method consists in arbitrarily selecting the geometrical barycenter of the selected triangle to be encoded as the encoding atom center, i.e. as the center of the 2D atoms, as illustrated in FIG. 1 in which the atom axes coincide with the image grid (X,Y). This choice ensures that the atoms stay in the middle of the triangle. Since this information is recoverable from the mesh at the decoder side, no additional information concerning atom positions has to be transmitted to the decoder. This results in a bit budget gain, in comparison to the block-based method for which each atom position has to be encoded. The reduction of the atom positioning freedom is partially compensated by the fact that, with this positioning strategy, atom positions do not need to be encoded and transmitted (since they are recoverable at the decoder side in the same way they have been performed at the encoder side), thus resulting in said increased bit budget for the texture enhancement.

Figure 2:
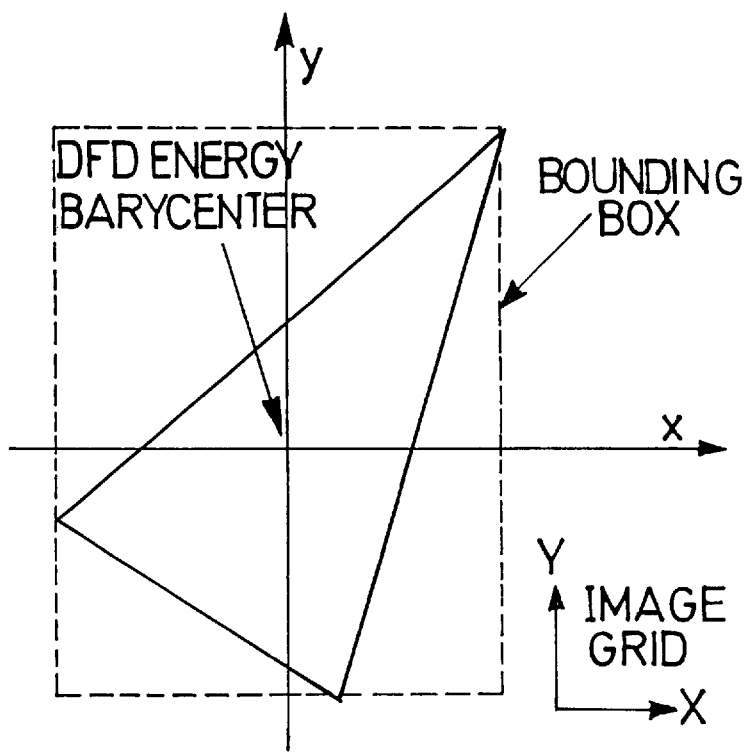
FIG. 2 illustrates a first variant of this geometrical method, allowing to reintroduce some positioning freedom (in comparison to the method illustrated in FIG. 1) by using the error energy information for atom center positioning.

However, if the geometrical choice ensures that the atoms stay in the "middle" of the triangle, it results in loosing the property of the MP with respect to the positioning freedom, which reduces the atom coding efficiency. In order to be more similar to the block-based approach, in which atoms are located on image regions where errors are high, the error energy information may be re-used for atom center positioning. To this end, the Displaced Frame Difference (DFD) energy barycenter inside the selected triangle (the one having the highest energy) is arbitrary chosen as the center of 2D atoms (FIG. 2). This position inside the triangle has to be transmitted in the decoder since said decoder has no information concerning the DFD. Since the MP procedure is iterative, it often occurs that a specific triangle is selected several times for texture encoding. This energy positioning reintroduces a certain degree of freedom inside a particular triangle during its successive processings. Moreover, this method is better adapted to the mesh refinement process, which successively splits triangles according to an energy criterion. Since the split triangles are chosen among those having the highest residual energy, they are more likely to be chosen by the MP algorithm for texture enhancement. Images reconstructed by means of this method present a better-located texture, with less visual artifacts than with the first one, and this for the same number of atoms used to code the prediction error.

Figure 3:
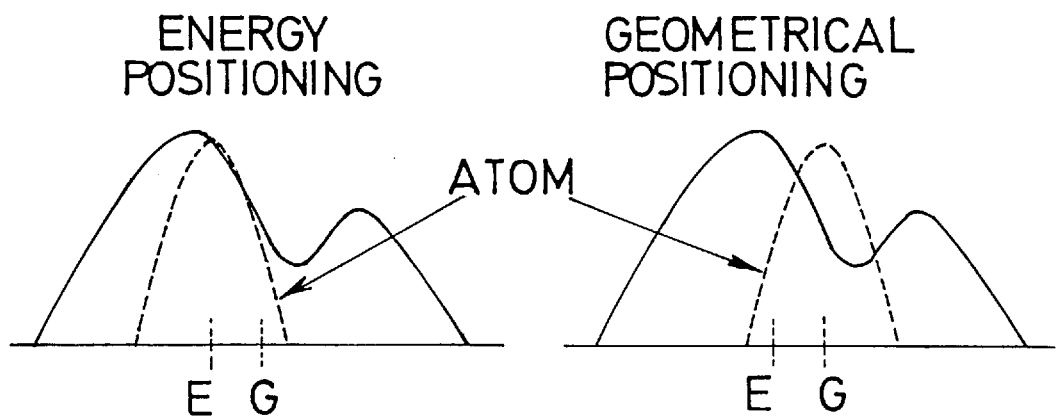
FIG. 3 illustrates a comparison between the geometrical and energy positioning methods.

In order to illustrate the difference between the geometrical positioning and the energy positioning, one may consider a particular unidimensional (1D) example, as illustrated in FIG. 3, the right side of which shows the geometrical positioning of the atom and the left side its energy positioning (G and E designate in each case the position of the geometrical and energy barycenter respectively). The energy positioning produces a more efficient coding since it successively places the atom at the best point. In fact, given a specific coding scheme, there is however to balance the benefit of a better positioning with the price to encode this position, since the energy positioning method presupposes that the atom positions have been transmitted to the decoder side. Moreover, the difference between the geometrical and energy barycenter is less and less important as the triangles are smaller and smaller.

Figure 4:
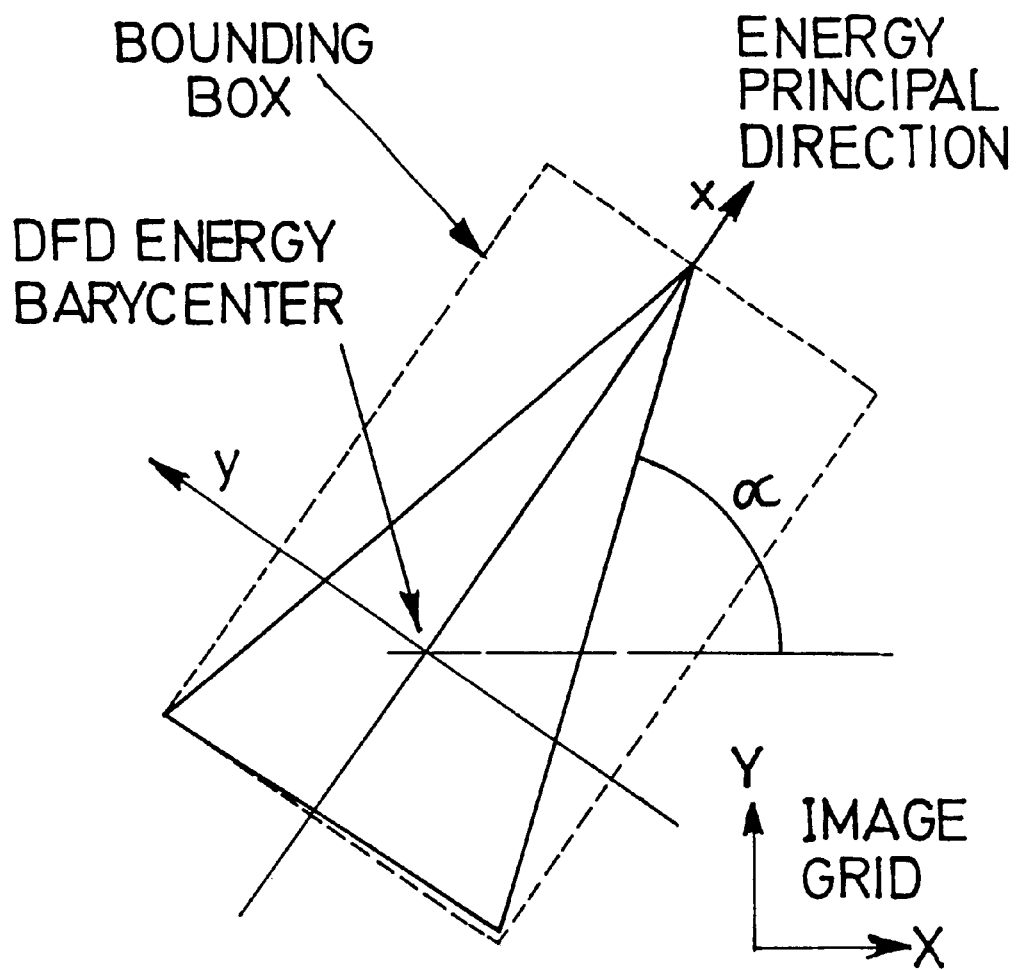
FIG. 4 illustrates an inertia atom positioning, which is a variant of the energy atom positioning method, allowing to obtain an alignment of the atom axes with the error signal they have to approximate, by means of an alignment of one atom axis along the principal direction of the DFD energy.

Another variant may also be proposed. In the previous method (FIG. 3), the atom axes are always parallel to the image grid, and this whatever the atom center position is. As illustrated in FIG. 4, an inertia positioning may add to the energy positioning the possibility to orient one atom axis along the principal direction of the DFD energy, that is the direction (represented by the angle α) along which the energy is the most important. In practice, triangle inertia moments weighted by the DFD energy are computed inside each triangle so as to deduce the energy principal direction, which is given by its angle with the image grid x-axis. The second axis (y-axis) is then simply perpendicular to this first direction.

In this case of the inertia atom positioning method, the computation of the DFD energy principal direction angle is done as now indicated. The inertia matrix is given by $$:\begin{bmatrix} a & c \\ c & b \end{bmatrix} \text{ where:}$$

$$a = \frac{1}{N}\sum_{k=1}^{N} x_k^2 - x_G^2,$$

$$b = \frac{1}{N}\sum_{k=1}^{N} y_k^2 - y_G^2 \text{ and}$$

$$c = \frac{1}{N}\sum_{k=1}^{N} x_k y_k - x_G y_G$$

$x_K$ and $y_K$ are respectively the x-abcissas and the y-abscissas of the studied data, and $$x_G = \frac{1}{N}\sum_{k=1}^{N} xk \text{ and } y_G = \frac{1}{N}\sum_{k=1}^{N} yk$$

are the data barycenters. In the present case, one has:

$x = x(i,j)*DFD^2(i,j),$ $y = y(i,j)*DFD^2(i,j),$ and $$N = \sum_{i,j} DFD^2(i,j)$$

where (i,j) is a point inside the selected triangle. The principal direction angle α is simply given by $$\tan(2\alpha) = \frac{2c}{a-b}.$$

A better atom positioning is achieved by this method through the alignment of the atom axes with the error signal they have to approximate. Nevertheless, atom axes are not aligned with the image grid and discrete atom tables can no longer be used. Real atom values that are dynamically computed during the MP procedure have to be introduced. Moreover, the improvement brought by the inertia positioning has also an additional cost: the need to encode and transmit the angle defining the atom axis. As a consequence, a rate-distortion trade-off has to be realized between the two situations: either the atom axis is aligned with the DFD energy principal direction, and a part of the bit budget allowed for atom encoding is spent instead of sending the angle of this direction, or the atom axis is aligned with the image grid and the same part of the bit budget is really used to send more atoms for each triangle, thus resulting in an improved reconstruction of the texture inside the mesh. One has therefore to balance the benefit of a better atom location with the price to encode its parameters (center position, axis angle).

The choice of the atom dictionary constitutes a key factor in the efficiency and the convergence speed of the MP method, and it is therefore useful to optimize the function set according to the triangle characteristics. As already mentioned, the strong constraint that consists in allowing only texture enhancement at a triangle scale decreases the property of atom overlapping. In order to compensate this, a special attention has been paid to the choice of the basis functions. Increasing the redundancy of functions and so the overcomplete nature of the basis is nevertheless not an acceptable solution, because it increases the algorithm burden.

Since the major modification of the method is linked to the special geometrical nature of the support, it has been chosen to first optimize several dictionaries according to the triangle size. A training base of video sequences has been processed by means of a mesh-based coding system where the mesh is more or less dense. The coarsest mesh is applied on QCIF (Quarter Common Intermediate Format) images and consists of 32 triangles arranged in a quincunx. These triangles are further refined through next levels with respect to a split criterion. For each mesh configuration, atom parameters have been chosen between those that were most often selected during the training. In addition to the most frequent parameters, triplets that represent smooth atoms have been deliberately added to the retained dictionaries. The reason is that dictionaries have to be as complete as possible, while remaining reasonably small, in order to fit different configurations, also some ones which may have not occurred during the training phase. Doing this, several dictionaries are obtained, each of which is optimized for a particular kind of triangle. Table 2 shows an example of resulting atom dictionaries, optimized for a three step splitting procedure:

| i | $S_i$ | $F_i$ | $P_i$ | i | $S_i$ | $F_i$ | $P_i$ | i | $S_i$ | $F_i$ | $P_i$ |
|---|---|---|---|---|---|---|---|---|---|---|---|
| 1 | 9.0 | 0.0 | 0.0 | 1 | 5.0 | 0.0 | 0.0 | 1 | 1.0 | 0.0 | 0.0 |
| 2 | 9.0 | 2.0 | 0.0 | 2 | 5.0 | 1.0 | 0.0 | 2 | 1.0 | 2.0 | 0.0 |
| 3 | 9.0 | 4.0 | 0.0 | 3 | 5.0 | 2.0 | 0.0 | 3 | 3.0 | 0.0 | 0.0 |
| 4 | 9.0 | 4.0 | $\pi/4$ | 4 | 5.0 | 4.0 | 0.0 | 4 | 3.0 | 1.0 | 0.0 |
| 5 | 9.0 | 4.0 | $\pi/2$ | 5 | 5.0 | 4.0 | $\pi/4$ | 5 | 3.0 | 1.0 | $\pi/4$ |
| 6 | 11.0 | 0.0 | 0.0 | 6 | 5.0 | 4.0 | $\pi/2$ | 6 | 3.0 | 1.0 | $\pi/2$ |
| 7 | 11.0 | 4.0 | 0.0 | 7 | 7.0 | 0.0 | 0.0 | 7 | 3.0 | 2.0 | 0.0 |
| 8 | 13.0 | 0.0 | 0.0 | 8 | 7.0 | 1.0 | 0.0 | 8 | 3.0 | 2.0 | $\pi/4$ |
| 9 | 15.0 | 0.0 | 0.0 | 9 | 7.0 | 1.0 | $\pi/4$ | 9 | 3.0 | 2.0 | $\pi/2$ |
| 10 | 15.0 | 1.0 | $\pi/4$ | 10 | 7.0 | 1.0 | $\pi/2$ | 10 | 5.0 | 0.0 | 0.0 |
| 11 | 15.0 | 1.0 | $\pi/2$ | 11 | 7.0 | 4.0 | 0.0 | 11 | 5.0 | 1.0 | 0.0 |
| 12 | 15.0 | 4.0 | 0.0 | 12 | 9.0 | 0.0 | 0.0 | 12 | 5.0 | 1.0 | $\pi/4$ |
| 13 | 17.0 | 0.0 | 0.0 | 13 | 9.0 | 1.0 | $\pi/4$ | 13 | 5.0 | 1.0 | $\pi/2$ |
| 14 | 17.0 | 1.0 | $\pi/4$ | 14 | 9.0 | 1.0 | $\pi/2$ | 14 | 5.0 | 2.0 | 0.0 |
| 15 | 17.0 | 1.0 | $\pi/2$ | 15 | 9.0 | 4.0 | 0.0 | 15 | 5.0 | 2.0 | $\pi/4$ |
| 16 | 19.0 | 0.0 | 0.0 | 16 | 11.0 | 0.0 | 0.0 | 16 | 5.0 | 2.0 | $\pi/2$ |
| 17 | 19.0 | 1.0 | $\pi/4$ | 17 | 11.0 | 1.0 | $\pi/4$ | 17 | 5.0 | 3.0 | 0.0 |
| 18 | 19.0 | 1.0 | $\pi/2$ | 18 | 11.0 | 1.0 | $\pi/2$ | 18 | 5.0 | 3.0 | $\pi/2$ |
| 19 | 21.0 | 0.0 | 0.0 | 19 | 13.0 | 0.0 | 0.0 | 19 | 5.0 | 4.0 | 0.0 |
| 20 | 21.0 | 1.0 | 0.0 | 20 | 13.0 | 1.0 | $\pi/4$ | 20 | 5.0 | 4.0 | $\pi/4$ |
| 21 | 21.0 | 1.0 | $\pi/2$ | 21 | 13.0 | 1.0 | $\pi/2$ | 21 | 7.0 | 0.0 | 0.0 |
| 22 | 23.0 | 0.0 | 0.0 | 22 | 15.0 | 0.0 | 0.0 | 22 | 7.0 | 1.0 | 0.0 |
| 23 | 23.0 | 1.0 | 0.0 | 23 | 17.0 | 0.0 | 0.0 | 23 | 7.0 | 1.0 | $\pi/4$ |
| 24 | 23.0 | 1.0 | $\pi/4$ | 24 | 19.0 | 0.0 | 0.0 | 24 | 7.0 | 1.0 | $\pi/2$ |
| 25 | 23.0 | 1.0 | $\pi/2$ | 25 | 19.0 | 1.0 | $\pi/4$ | 25 | 7.0 | 2.0 | 0.0 |
| 26 | 23.0 | 2.0 | 0.0 | 26 | 19.0 | 1.0 | $\pi/2$ | 26 | 7.0 | 3.0 | 0.0 |
| 27 | 23.0 | 2.0 | $\pi/4$ | 27 | 19.0 | 2.0 | 0.0 | 27 | 7.0 | 3.0 | $\pi/2$ |
| 28 | 23.0 | 2.0 | $\pi/2$ | 28 | 19.0 | 2.0 | $\pi/4$ | 28 | 7.0 | 4.0 | 0.0 |
| 29 | 23.0 | 3.0 | 0.0 | 29 | 19.0 | 2.0 | $\pi/2$ | 29 | 9.0 | 0.0 | 0.0 |
| 30 | 23.0 | 3.0 | $\pi/4$ | 30 | 19.0 | 3.0 | 0.0 | 30 | 9.0 | 1.0 | $\pi/2$ |
| 31 | 23.0 | 3.0 | $\pi/2$ | 31 | 19.0 | 3.0 | $\pi/2$ | 31 | 15.0 | 0.0 | 0.0 |
| 32 | 23.0 | 4.0 | 0.0 | 32 | 19.0 | 4.0 | 0.0 | 32 | 15.0 | 1.0 | $\pi/2$ |
| 33 | 23.0 | 4.0 | $\pi/4$ | | Dictionary 2 | | | | Dictionary 3 | | |
| 34 | 23.0 | 4.0 | $\pi/2$ | | | | | | | | |
| | Dictionary 1 | | | | | | | | | | |

The training image base, composed of 1525 images of a sequence in QCIF format, is the concatenation of several sequences of different kinds called "Nature" (nature sequence following animals walking in grass), "News" (a typical head and shoulder sequence), "Rugby" (very demanding sport sequence with various kind of movements, saturated colors and camera panning), and "Drama" (a rather static sequence). The training function dictionaries are each composed of more than one hundred parameters triplets with 12 odd scale values ranging from 1.0 to 23.0, five frequency values from 0.0 to 4.0 and three phase values (0, $\pi/4$ and $\pi/2$). The three dictionaries are arbitrarily associated to the three levels of the hierarchical coding scheme.

With respect to the coding method thus described, modifications or improvements may be proposed without departing from the scope of the invention. For instance, a triangular mesh-based video-coding scheme may be improved by a hierarchical representation. Hierarchy addresses the issue of finding optimal patch sizes and a tool for providing a description that is progressively refined from level to level. Thus, the extension towards hierarchical meshes is a response to scalability. The hierarchy may be initialized to an arbitrary coarse mesh that is successively refined according to a specified criterion (energy for instance). The hierarchy used in the present case consists in combining a mesh grid with the image at each resolution, to the effect that the coarsest mesh is coupled to the lowest resolution image. Here, the term resolution refers to a low-pass filtering that is performed on source images without any downsampling, and not to a decimation. Thus, image and mesh couples consist of elements that provide an information accuracy increasing with the level.

With respect to the MP method applied on triangles, the choice of the basis functions is not easy, since it influences both encoding speed and efficiency. Three dictionaries have therefore been proposed, so as to provide each level with an adapted function set. The key factor is obviously the scale parameter that determines the function support. One solution is to arbitrarily associate each hierarchical level with one specific dictionary, the one that has been optimized for this level. However, considering the mesh refinement process between two levels that updates only a part of all triangles, if the first level mesh consists of "large" triangles, it cannot be supposed that next level meshes are only composed of "medium" and "small" triangles. To circumvent this issue, a dynamical preselection of the dictionary is added to the triangle-based MP method. This dictionary selection does neither increase the algorithm burden nor slow down its convergence speed. The reason is that the selection is made on-line before the computation of the best atom, and this, at each iteration.

Whichever the selected dictionary, the MP process searches later the best atom within this only dictionary, and so on for each selected triangle. Thus, it does not amount to take account of all N dictionaries, which would be equivalent to have one dictionary N times as large. Therefore, this dictionary preselection provides the advantage of having several potential dictionaries, and however the same number of effective calculations as if there was only one. This method is all the more interesting that it does not require the addition of a fourth atom parameter. The atom size that influences the choice of the dictionary is actually derived from an information which is already present in the mesh and which thus does not need to be transmitted. It is recoverable at the decoder side in the same way as it has been obtained at the encoder side. Nevertheless, dictionaries still remain to be transmitted, or at least known by the decoder.

In the previous description, the Matching Pursuit algorithm has been therefore directly applied on the mesh-based support without using classical block-based image partitioning. The proposed three atom positioning methods deal with the adaptation of the baseline Matching Pursuit procedure to the triangular support. Moreover, the introduction of a dynamical dictionary preselection allows to have a potentially greater number of optimized dictionaries while keeping the same number of effective calculations during the MP stage, and this for each encoded atom. The index of the selected dictionary does not need to be sent to the decoder and therefore defines an intrinsic supplementary atom parameter. The methods thus described, based on the use of triangular meshes, may be implemented in a signal-to-noise ratio (SNR) scalable video encoder, which is within the scope of the present invention.

What is claimed is:

1. In a signal-to-noise ratio (SNR) scalable video encoder, an encoding method based on an adaptation of the so-called matching pursuit method (MP) to an error texture coding process inside triangular meshes, said error texture coding process being restricted, at each iteration of said MP method, to a specific triangle selected according to a predefined criterion and with respect to which the optimal strategy for atom positioning inside this triangle, in view of a fast energy decrease of the error signal, consists in arbitrarily selecting the geometrical barycenter of the selected triangle as the center of the atoms, no additional information concerning atom positions being transmitted to the decoder.

2. In a signal-to-noise ratio (SNR) scalable video encoder, an encoding method based on an adaptation of the so-called matching pursuit method (MP) to an error texture coding process inside triangular meshes, said error texture coding process being restricted, at each iteration of said MP method, to a specific triangle selected according to a predefined criterion and with respect to which the optimal strategy for atom positioning inside this triangle, in view of a fast energy decrease of the error signal, re-uses the error energy information for atom center positioning, the Displaced Frame Difference (DFD) energy barycenter inside the selected triangle having the highest energy being then arbitrarily chosen as the center of the atoms, and this position inside the triangle being an additional information transmitted to the decoder.

3. An encoding method according to claim 2, in which the optimal strategy for atom positioning is an inertia atom positioning method adding to the energy positioning one an orientation step provided for orienting one atom axis along the principal direction of the DFD energy, i.e. the direction along which the energy is the most important, the second axis being perpendicular to this first direction, and the implementation of said inertia positioning method involving to encode and transmit as an additional information the angle defining the atom axis.

4. An encoding method according to any one of claims 1 to 3, said method being improved by the use of hierarchical meshes, the hierarchy being initialized with an arbitrary coarse mesh that is successively refined according to said predefined criterion.

5. An encoding method according to claim 4, in which said hierarchy consists in combining a mesh grid with the image at each resolution, to the effect that the coarsest mesh is coupled to the lowest resolution image so that image and mesh couples consist of elements providing an information accuracy that increases with the level.

6. An encoding method according to claim 5, in which said predefined criterion is an energy criterion.

7. A signal-to-noise ratio (SNR) scalable video encoder implementing a triangular mesh based encoding method according to any one of claims 1 to 6.

* * * * *